United States Patent
Murray

(10) Patent No.: US 10,634,388 B2
(45) Date of Patent: Apr. 28, 2020

(54) FLEXIBLE POUCH WITH HEATING MODULES

(71) Applicant: Pouch Pac Innovations, LLC, Sarasota, FL (US)

(72) Inventor: R. Charles Murray, Sarasota, FL (US)

(73) Assignee: PPI Technologies Group, LLC, Sarasota, FL (US)

( * ) Notice: Subject to any disclaimer, the term of this patent is extended or adjusted under 35 U.S.C. 154(b) by 7 days.

(21) Appl. No.: 15/367,837

(22) Filed: Dec. 2, 2016

(65) Prior Publication Data

US 2017/0159971 A1    Jun. 8, 2017

Related U.S. Application Data

(60) Provisional application No. 62/261,903, filed on Dec. 2, 2015.

(51) Int. Cl.
| | | |
|---|---|---|
| *B65D 81/18* | (2006.01) | |
| *B65D 75/00* | (2006.01) | |
| *B65D 81/34* | (2006.01) | |
| *F24V 30/00* | (2018.01) | |
| *A47J 36/28* | (2006.01) | |
| *B65D 75/58* | (2006.01) | |
| *B65D 75/52* | (2006.01) | |

(52) U.S. Cl.
CPC .............. *F24V 30/00* (2018.05); *A47J 36/28* (2013.01); *B65D 75/008* (2013.01); *B65D 75/527* (2013.01); *B65D 75/5805* (2013.01); *B65D 81/3484* (2013.01)

(58) Field of Classification Search
CPC ............ A61J 2200/42; B65D 75/5805; B65D 75/527; B65D 75/008; B65D 81/3484; B65D 83/74; A47J 36/28; F24J 1/00
USPC ....... 126/263.06, 263.07; 426/109, 113, 114, 426/394, 412; 219/725, 729, 730, 734, 219/735; 383/38, 37, 111, 66, 102
See application file for complete search history.

(56) References Cited

U.S. PATENT DOCUMENTS

| | | | | |
|---|---|---|---|---|
| 5,148,804 A | * | 9/1992 | Hill ........................... | A61F 7/10 607/108 |
| 5,716,388 A | * | 2/1998 | Petelle ...................... | A61F 7/02 126/204 |
| 6,143,316 A | * | 11/2000 | Hayden ................ | A61K 9/0056 424/438 |
| 6,736,834 B1 | * | 5/2004 | Kumar ............... | A61B 17/8863 607/114 |
| D650,085 S | * | 12/2011 | Rucker ........................ | D24/207 |
| 2002/0020407 A1 | * | 2/2002 | Wohland ................ | A45D 34/00 126/263.03 |
| 2007/0106350 A1 | * | 5/2007 | Carstens .............. | A41D 13/005 607/108 |
| 2008/0128431 A1 | * | 6/2008 | Gradzewicz ....... | B65D 75/5838 220/592.01 |
| 2009/0142006 A1 | * | 6/2009 | Wine .................... | B65D 31/12 383/38 |

(Continued)

*Primary Examiner* — Grant Moubry
*Assistant Examiner* — Rabeeul I Zuberi
(74) *Attorney, Agent, or Firm* — Dinsmore & Shohl LLP

(57) ABSTRACT

A flexible pouch for heating articles includes a pair of panels forming a compartment and a pair of heating units which are disposed on either side of the compartment to heat the articles within the compartment. Seal portions are formed adjacent side edges for forming a holding area to be grasped by the hand of the user.

4 Claims, 7 Drawing Sheets

(56) References Cited

U.S. PATENT DOCUMENTS

2014/0199002 A1\* 7/2014 Murray .................. B65D 33/02
 383/119
2016/0304266 A1\* 10/2016 Huffer ................ B65D 81/3484

\* cited by examiner

FLEXIBLE POUCH WITH HEATING MODULES

CROSS-REFERENCE TO RELATED APPLICATIONS

This application claims priority of U.S. Provisional Patent Application Ser. No. 62/261,903, filed Dec. 2, 2015, which is incorporated herein by reference.

FIELD OF THE INVENTION

The invention relates generally to flexible pouches and more particularity a pouch having a pair of heating modules.

BACKGROUND OF THE INVENTION

It is known to use chemical heating modules in packages for heating food and other materials. The packages are particularly useful for hiking and other activities where stoves are not available. The heating module is disposed on one side of food packet. The heating modules create heat by way of an exothermic chemical reaction. In some cases two separate chemicals are held separately. Frangible seals are broken to mix the chemicals together to produce the heat. Also known is a sanitary wipe product, produced by RBC Technologies of College Park, Tex. which utilizes zinc baked onto blotter paper as a heat module. The zinc reacts with oxygen to produce heat. The package has a removable panel covering holes. When the panel is removed, oxygen passes through the holes in the packaging to contact the heating module and start a heating reaction. The sanitary wipes are held in the compartment adjacent to the heating module. After heating, the wipes are removed from the compartment for use.

However, currently produced packaging is difficult to use when the package starts getting hot. Likewise, it is sometimes difficult to get sufficient heat from the heating module to heat the contents of the package to the required temperature.

SUMMARY OF THE INVENTION

A pouch for containing articles for heating includes a pair of spaced apart panels, each panel having an outer surface and an inner surface, the inner surfaces defining an article holding compartment. The pouch includes a pair of heating modules, each of the modules mounted to a respective outer surface of one of the panels such that when activated the heat modules supply heat to the articles contained within the compartment. The pouches also include holding areas formed as part of a seal extending from the side edge of the pouch to enable the user to hold the pouch.

In one embodiment of the invention the heating modules are mounted directly to the outer surface of the panels forming the compartment. In an alternative embodiment the pouch is formed with a pair of spaced apart center seals disposed between a pair of side seals forming a center portion and a pair of side portions. The center portion forms the article holding compartment. The heating elements are mounted to the outer surface of the side portions on opposite sides so that the side portions may be folded over opposite sides of the center portion to heat articles in the compartment. The pouch may also contain lines of weakening along the center seals to permit removal of the side portions after the contents have been heated.

BRIEF DESCRIPTION OF THE DRAWINGS

For a full understanding of the invention, reference is made to the following detailed description, taken in connection with the accompanying drawings illustrating various embodiments of the present invention, in which.

DETAILED DESCRIPTION OF THE PREFERRED EMBODIMENTS

A novel flexible pouch includes a compartment for articles disposed between a pair of heating modules. The pouch also includes a sealed area for grasping by the users hand. The pouch is suitable for heating a range of articles including food, beverage and wipes. The pouch may be pre formed and sold to packages or to end users.

Figure 1:
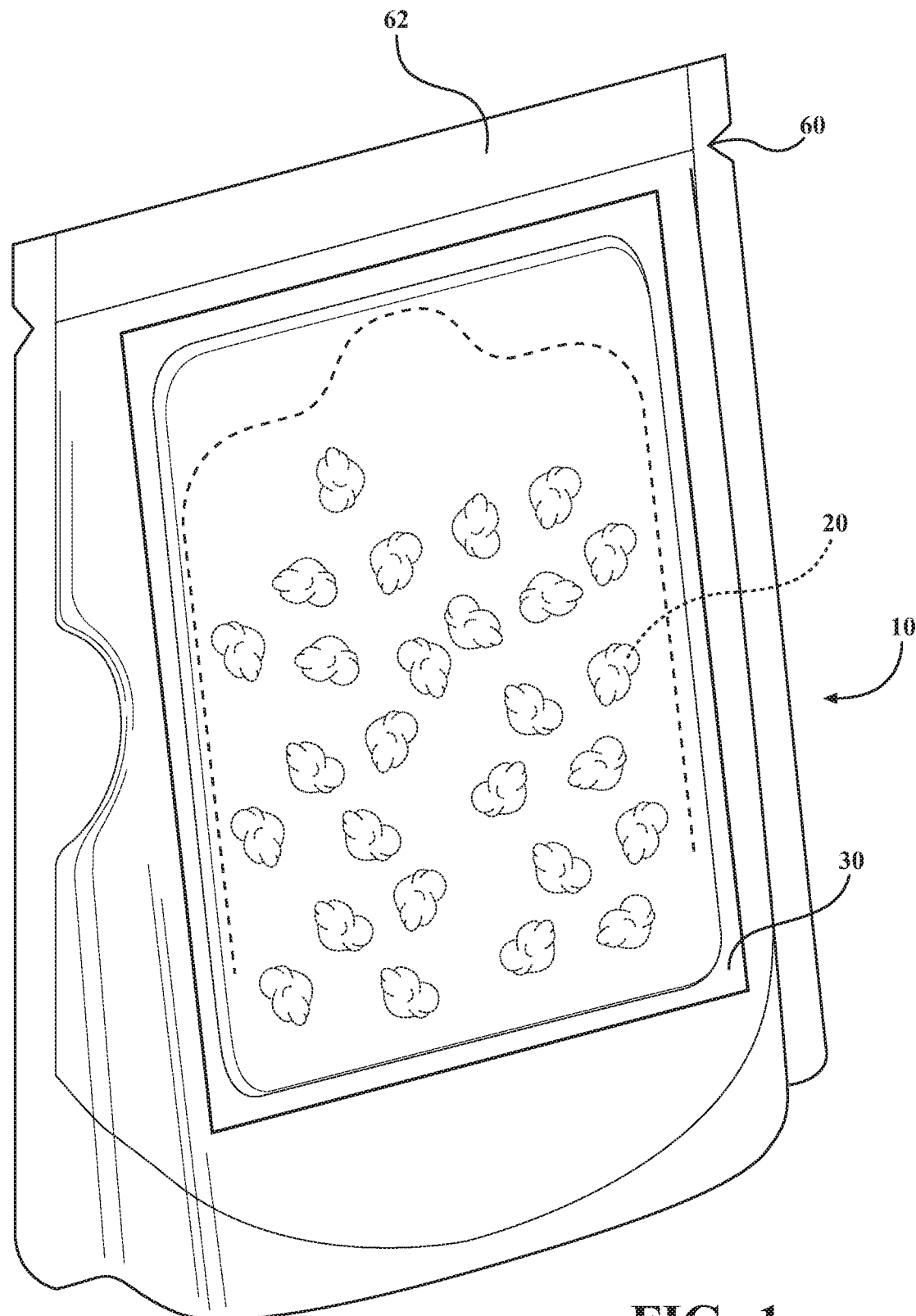
FIG. 1 illustrates a perspective view of a sealed pouch in accordance with the first embodiment of the invention.
Figure 2:
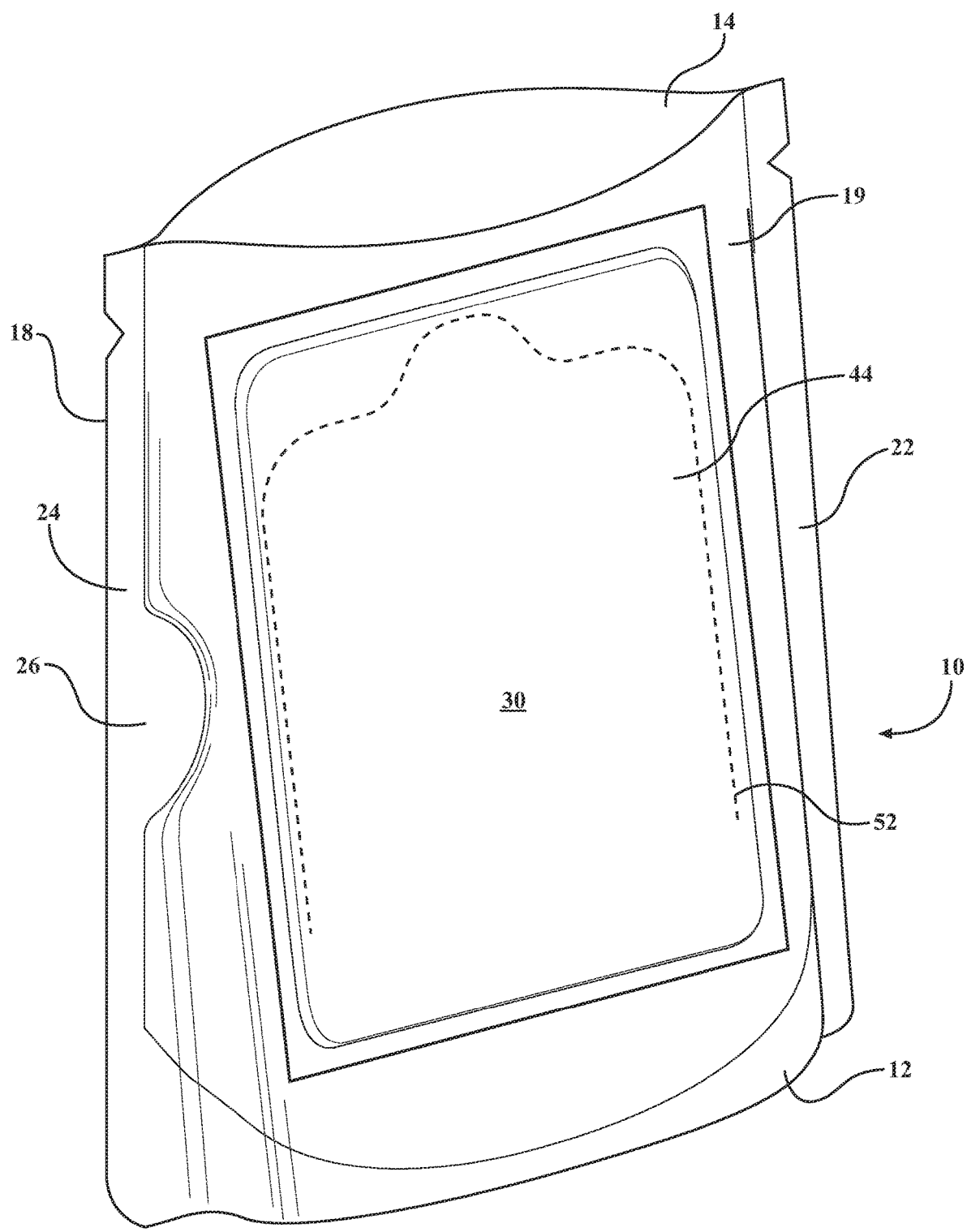
FIG. 2 is a perspective view of an open pouch in accordance with the first embodiment of the invention.
Figure 3:
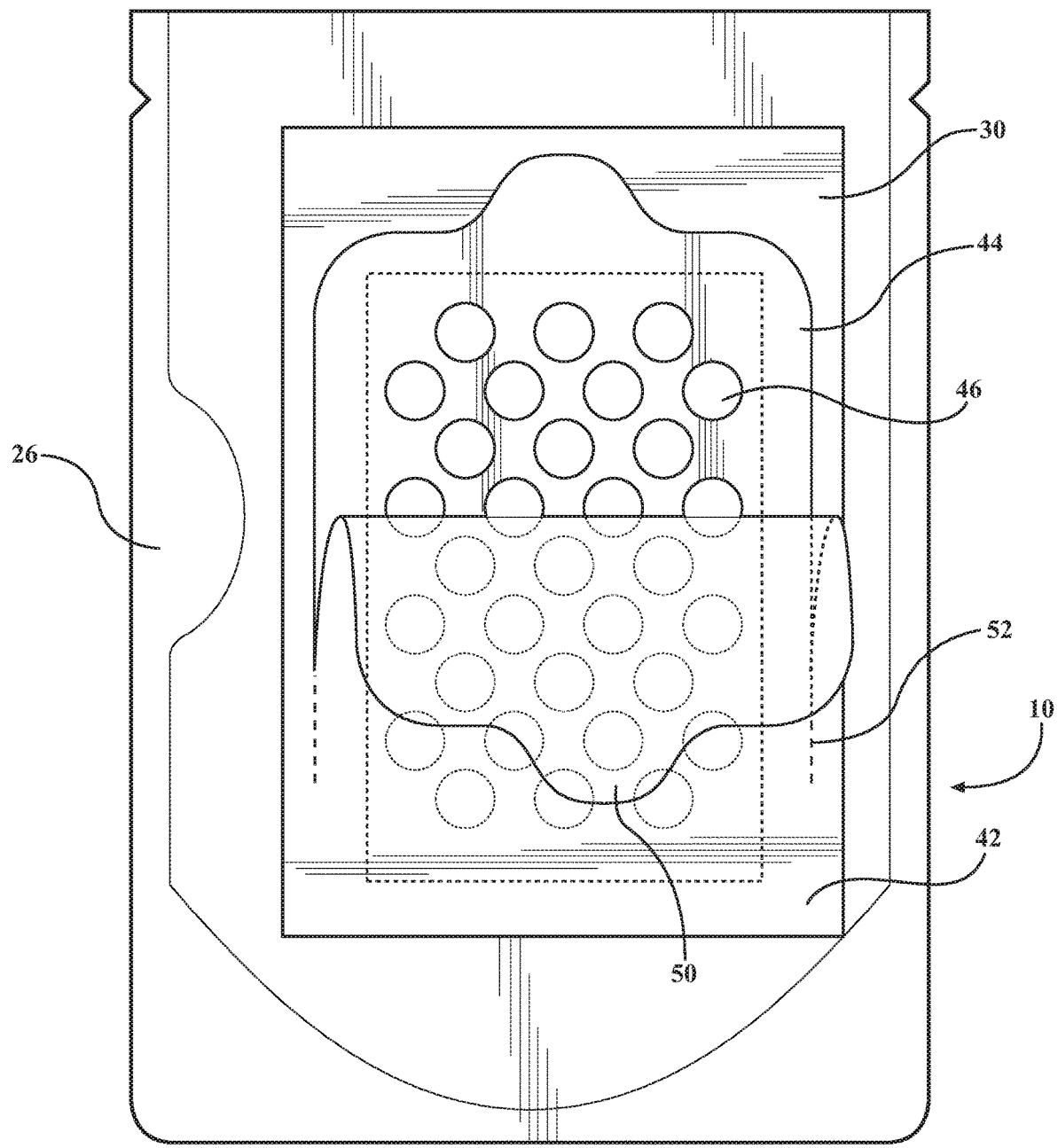
FIG. 3 is a front view of a pouch showing the pull tab of the heating module partially removed in accordance with the first embodiment of the invention.
Figure 4:
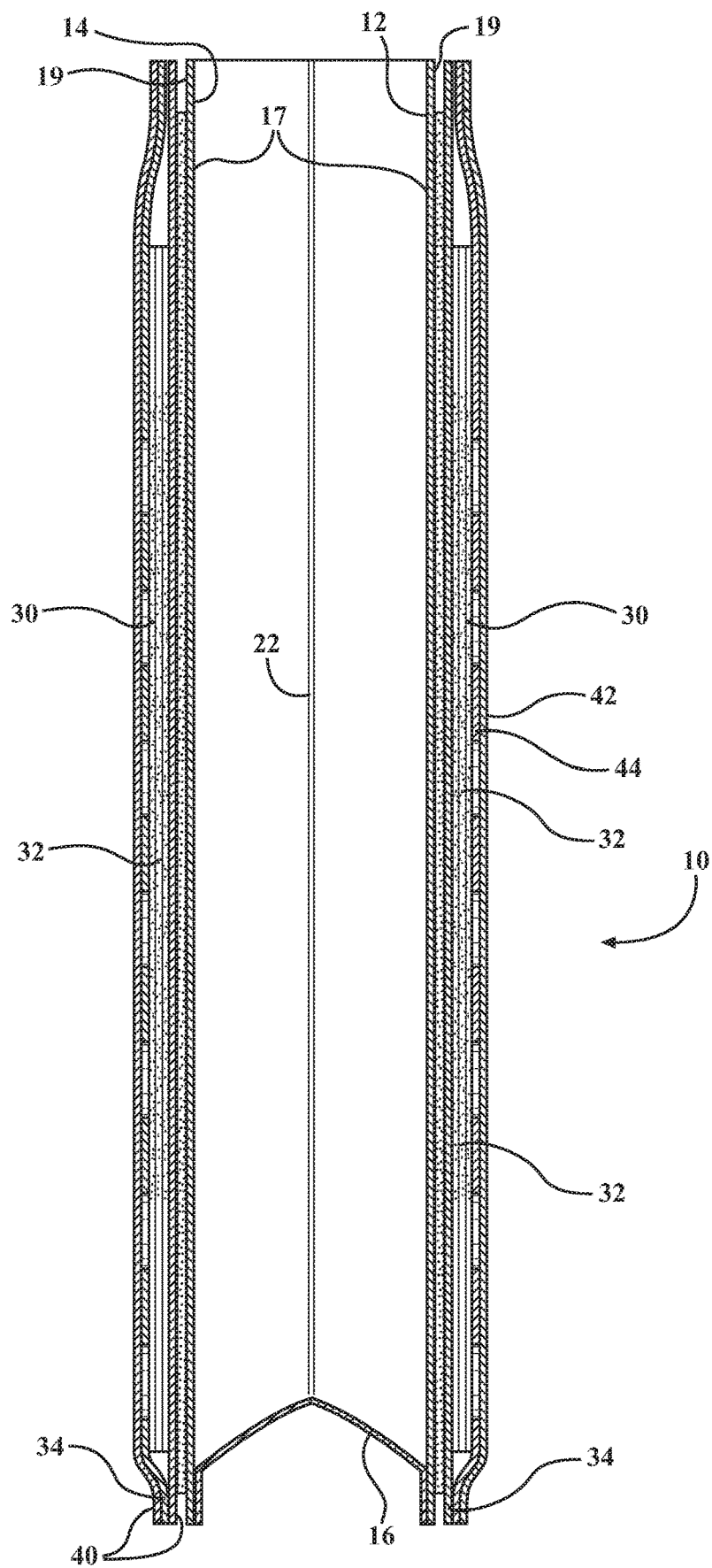
FIG. 4 is a cross-sectional side view of a pouch in accordance with the first embodiment of the invention.

A first preferred embodiment of the pouch 10 for heating article 20 is shown in FIGS. 1-4. The pouch 10 is a Doyen style standup pouch which is formed of a laminate material. The laminate material may include two to four layers of flexible material such as nylon, aluminum film, PET, depending upon the contents of the articles 20. As best shown in FIGS. 2 and 4 The pouch 10 is formed in a conventional manner with a front panel 12 and rear panel 14 and a bottom gusset panel 16. The panels are sealed together to form a pouch with a generally triangular cross section when sealed at the top. Inner surfaces 17 of the front and rear panels are sealed on side edges 18 to form side seals 22, 24. One seal 24 has a protrusion 26 which curves inwardly towards the seal 22 to form a holding area protrusion 26. The protrusion 26 has a length of approximately 3 to 4 centimeters long and extends inwardly approximately 1½ centimeter from the edge 18 of the pouch. The protrusion 26 is formed by a seal bar which seals the panels together. The panels 12, 14 have inner surfaces 17 and outer surfaces 19. The inner surfaces 19 define a compartment for holding the articels 20. Since the protrusion 26 is formed of two panels 12, 14 sealed together the protrusion 26 does not get hot.

Figure 7:
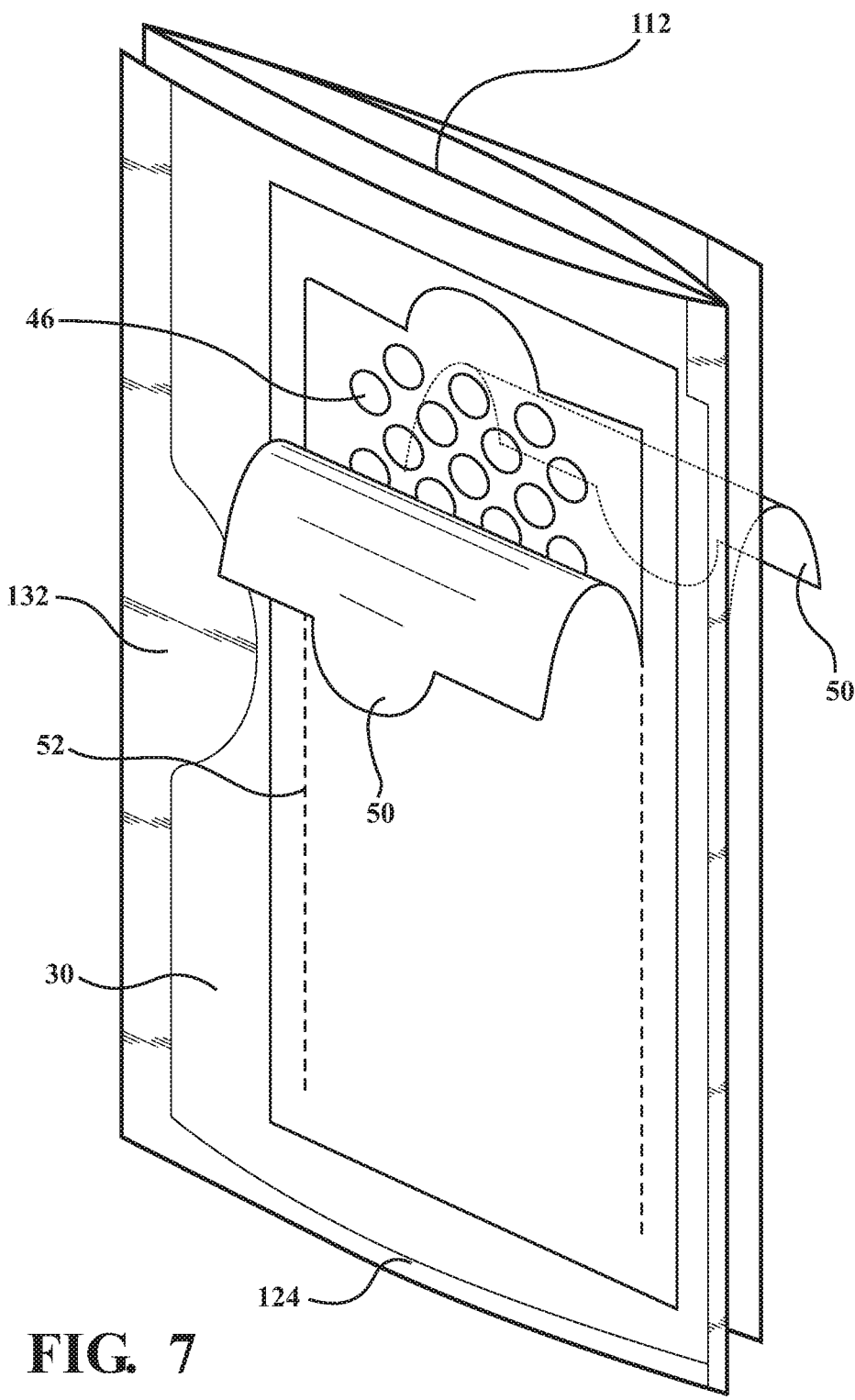
FIG. 7 is a perspective view of the pouch in a folded position for use in accordance with the second embodiment of the invention.

As best shown in FIGS. 2, 3, and 4, a heating module 30 is mounted to the outer surface of both the front panel and rear panel. Any suitable heating module may be used. A suitable heating module is of the type manufactured by RBC Technologies of College Park, Tex. The heating module 30 has a heating element 32 is contained in a foil pouch 34 The pouch 34 has a rear panel 36. A front panel 40 formed of a thin layer 42 of plastic which extends over a foil layer 44. The foil layer 44 has a series of apertures 46. The outer plastic layer 42 has a laser cut pull tab 50 and perforated side edges 52 which allows removal of portion 54 of the layer 42 covering the apertures 46. The heater modules 30 are affixed by adhesive patch 38 to outer surfaces 56 of the panels 12 and 14, product is filled into the pouch and a top seal 62 is put across the top as shown in FIG. 7. The pouch includes tear notches 60 for removal of the top seal 62 of the pouch to access the articles 20.

For use, the consumer holds the pouch 10 with the holding area, then pulls the tab 50 and portion 54 away and exposes the aperture 46. This allows oxygen to enter into heat element 32 which has blotter paper with zinc and to start the reaction which produces heat to heat the article 20 within the pouch 10. The holding area permits the user to hold the pouch while the heating occurs. After the article 20 are properly heated the top seal 62 is removed by tearing from the tear notches 60.

Figure 5:
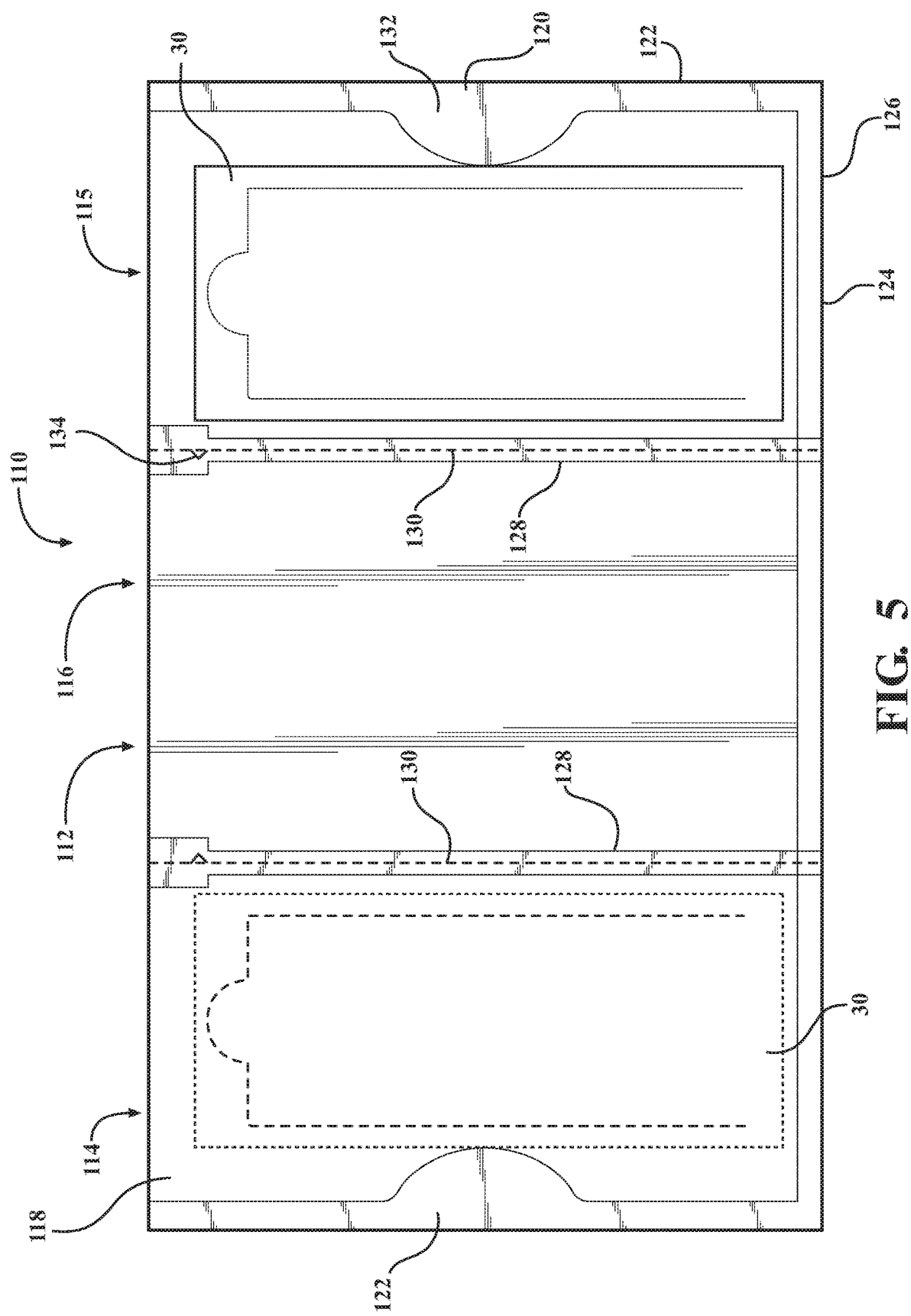
FIG. 5 is a front view of a pouch unfilled in accordance with a second preferred embodiment of the invention.
Figure 6:
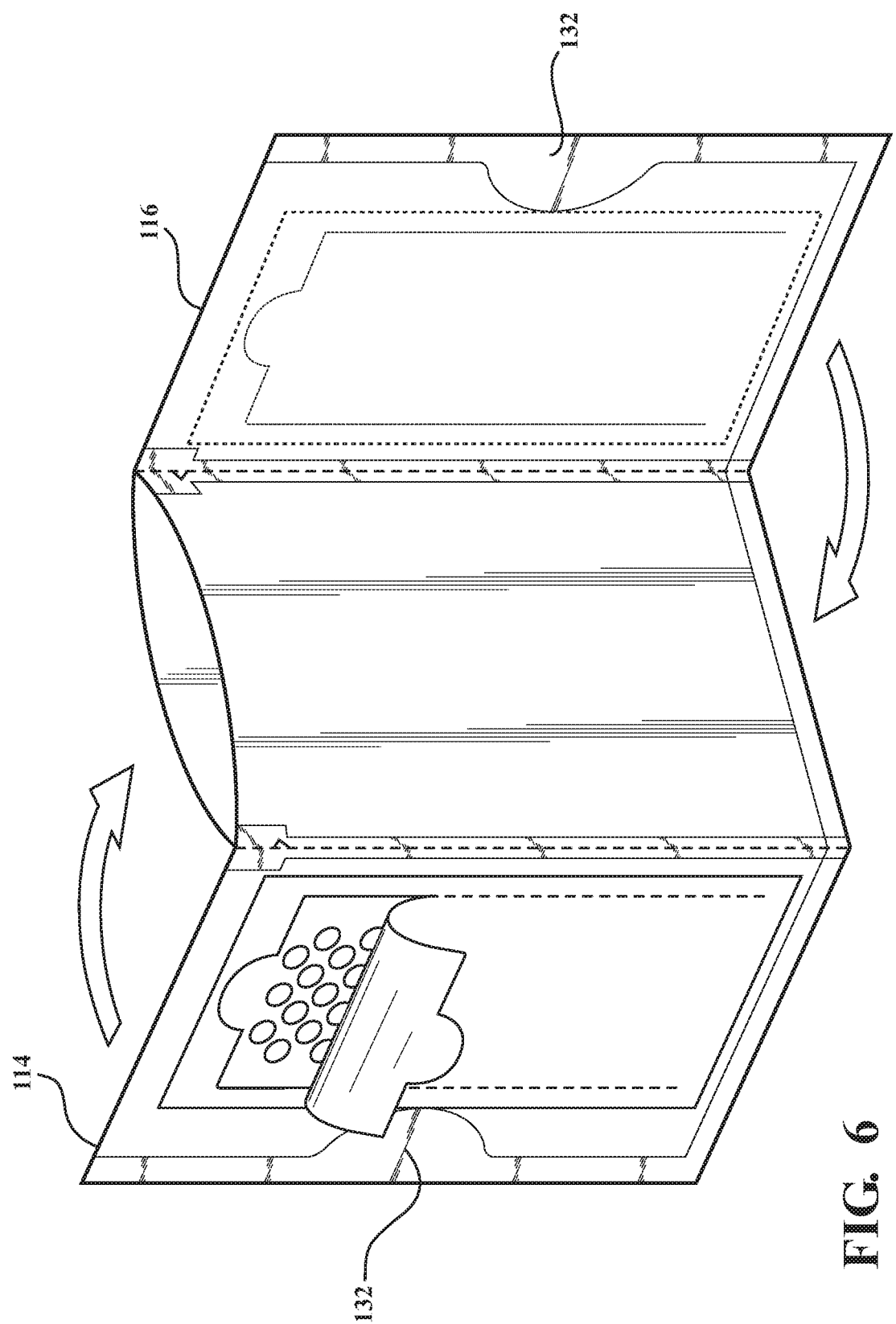
FIG. 6 is a perspective view showing the manner in which the side portions are folded over the center portion of the pouch in accordance with the second embodiment of the invention.

A second preferred embodiment of a pouch for heating articles is shown in FIGS. 5-7. The second embodiment is a flat pouch 110 having a center portion 112 between two side portions 114. The center portion 112 is formed as a compartment 116 for holding contents to be heated. The side portions have heater modules 30 mounted on opposite outside surfaces of the pouch. As best shown in FIG. 6, the side portions 114 are folded on either side of the center portion 112 so that the compartment 116 receives heat from both sides.

As shown in FIG. 6, the pouch 110 is formed from two panels 118, 119 of flexible material of the type described above. Side seals 120 are formed along opposite side edges 122 of the pouch and a bottom seal 124 is formed on a bottom edge 126. Additionally, two center seals 128 are formed parallel to the side edges 122 to form the three portions 112, 114. The two center seals 128 have lines of weaking or perforations 130 extending along the center axis of the center seals 128. This permits the side portions to be removed from the center after heating. The two protrusions 132 are formed by the seal bar when the side seals are formed to provide a holding area just as in the first embodiment Tear notches 134 are formed at the top portion of the center compartment to facilitate removal of a top seal 136.

As shown in FIG. 6, a first heat module 30 is adhered to an outer surface 136 of the panel over one of the side portions 114. A second heat module 31 is adhered to an outer surface 138 the opposite panel 119 of the pouch over the other side portions 114. The center compartment 112 now is filled with product as shown in and a top seal 140 is formed with a seal bar across the top of the pouch as shown in FIG. 7. Alternatively, the pouch may be sold for use empty as shown in FIG. 6 A clip (not shown) may be used to close the top of the compartment.

One side portion 114 is folded inwardly over the center portion 112 and the side portion 115 is folded in an opposite direction to overlay the other side of the center portion as shown in FIGS. 5, 6 and 7. As shown in FIG. 7, heat modules 30, are now on the outer sides and the protrusions 132 forming the holding areas over lay each other.

To use, the consumer pulls the pull tabs 50 and perforated flap from the aperture 46 to expose the zinc impregnated blotter paper to start the heating reaction. The consumer holds the holding area. After the heating is complete the two side portions 114, 115 are separated from the center portion by pulling down along the line of weakening 130 through the center seals 128 leaving only the center portion 112. If sealed the consumer then pulls the top portion off by using the tear notches 134 to access the contents.

Thus is disclosed two novel embodiments of a pouch for heating contents which rapidly and thoroughly heat the contents.

The invention claimed is:

1. A pouch for heating an article, the pouch comprising:
   a first panel having an exterior surface and a pair of side edges;
   a second panel having an exterior surface and a pair of side edges, the second panel sealed to the first panel at the side edges of the first and second panels;
   a pair of intermediate seals formed in the first and second panels, spaced apart from the side edges to form a center portion positioned between a pair of side portions, the center portion having a pair of outer surfaces adapted to hold the article therebetween, each of the pair of seals having a line of weakening to permit one of the pair of side portions to fold over and cover one side of the center portion and another of the pair of side portions to fold over and cover another of the outer surface of the center portion; and
   a pair of heat modules one of the pair of heat modules mounted to an exterior surface of one of the side portions and another of the pair of heat modules mounter to an exterior surface of the other side portion on the opposite side of the pouch, each of the pair of modules having an outer layer removable to activate heating thereby providing heat to both sides of the center portion to heat the article.

2. The pouch of claim 1 further comprising at least one protrusion extending from one of the side seals towards an opposite one of the side seals to form a holding portion.

3. The pouch of claim 1 wherein each of the pair of side portions and the center portions have generally the same width.

4. The pouch of claim 1 wherein the lines of weakening permit the side portions to be removed from the center portion.

* * * * *